US012649143B2

(12) United States Patent
Kim et al.

(10) Patent No.: US 12,649,143 B2
(45) Date of Patent: Jun. 9, 2026

(54) METHODS OF USE AND MANUFACTURE OF SILVER-DOPED, NANO-POROUS HYDROXYAPATITE

(71) Applicants: Mo-Sci Corporation, Rolla, MO (US); The Curators of the University of Missouri, Rolla, MO (US)

(72) Inventors: Cheol-Woon Kim, Rolla, MO (US); Richard K. Brow, Rolla, MO (US); Jen-Hsien Hsu, Keller, TX (US)

(73) Assignees: MO-SCI CORPORATION, Rolla, MO (US); THE CURATORS OF THE UNIVERSITY OF MISSOURI, Rolla, MO (US)

( * ) Notice: Subject to any disclaimer, the term of this patent is extended or adjusted under 35 U.S.C. 154(b) by 961 days.

(21) Appl. No.: 17/857,388

(22) Filed: Jul. 5, 2022

(65) Prior Publication Data

US 2022/0401913 A1     Dec. 22, 2022

Related U.S. Application Data

(62) Division of application No. 16/257,514, filed on Jan. 25, 2019, now abandoned.

(Continued)

(51) Int. Cl.
B01J 20/04 (2006.01)
B01J 20/28 (2006.01)
(Continued)

(52) U.S. Cl.
CPC ....... B01J 20/048 (2013.01); B01J 20/28004 (2013.01); B01J 20/28019 (2013.01); B01J 20/2808 (2013.01); B01J 20/3021 (2013.01);

B01J 20/3078 (2013.01); B01J 20/3085 (2013.01); C01B 25/32 (2013.01);
(Continued)

(58) Field of Classification Search
CPC ............... B01J 20/048; B01J 20/28004; B01J 20/28019; B01J 20/2808; B01J 20/3021; B01J 20/3078; B01J 20/3085; C01B 25/32; G21F 9/02; G21F 9/12; G21F 9/16; G21F 9/162; C01P 2002/54; C01P 2002/72; C01P 2004/02; C01P 2004/03; C01P 2004/32; C01P 2004/61; C01P 2006/16
See application file for complete search history.

(56) References Cited

U.S. PATENT DOCUMENTS

| | | | | |
|---|---|---|---|---|
| 5,711,016 | A * | 1/1998 | Carpena | G21F 9/34 |
| | | | | 423/240 R |
| 6,358,531 | B1 | 3/2002 | Day et al. | |
| 2011/0008407 | A1 * | 1/2011 | Gan | A61P 31/04 |
| | | | | 424/673 |

(Continued)

OTHER PUBLICATIONS

"Preparation and characterization of silver coated alumina for isolation of iodine-131 from fission products" (Year: 2014).*
Novel Long-Term Immobilization Method for Radioactive Iodine-129 Using a Zeolite/Apatite Composite Sintered Body (Year: 2009).*

(Continued)

*Primary Examiner* — Daniel C. Mccracken
*Assistant Examiner* — Starfari Teshawn McClain
(74) *Attorney, Agent, or Firm* — Farber LLC

(57) ABSTRACT

A silver-doped, nano-porous hydroxyapatite material is provided that can be utilized to capture radioactive iodine, $^{129}I$. Methods of using the silver-doped, nano-porous hydroxyapatite material to remove radioactive iodine, and methods of manufacturing the material are also provided.

14 Claims, 4 Drawing Sheets

10.0um

Related U.S. Application Data

(60) Provisional application No. 62/621,910, filed on Jan. 25, 2018.

(51) Int. Cl.

| | |
|---|---|
| *B01J 20/30* | (2006.01) |
| *C01B 25/32* | (2006.01) |
| *G21F 9/02* | (2006.01) |
| *G21F 9/12* | (2006.01) |
| *G21F 9/16* | (2006.01) |

(52) U.S. Cl.
CPC .................. *G21F 9/02* (2013.01); *G21F 9/12* (2013.01); *G21F 9/16* (2013.01); *G21F 9/162* (2013.01); *C01P 2002/54* (2013.01); *C01P 2002/72* (2013.01); *C01P 2004/02* (2013.01); *C01P 2004/03* (2013.01); *C01P 2004/32* (2013.01); *C01P 2004/61* (2013.01); *C01P 2006/16* (2013.01)

(56) References Cited

U.S. PATENT DOCUMENTS

| | | |
|---|---|---|
| 2013/0078476 A1 | 3/2013 | Riman et al. |
| 2013/0182812 A1 | 7/2013 | Eckardt et al. |
| 2014/0255492 A1 | 9/2014 | Mansouri |
| 2015/0258239 A1 | 9/2015 | Lamberti et al. |
| 2016/0032114 A1 | 2/2016 | Hager et al. |
| 2017/0088471 A1 | 3/2017 | Randall et al. |
| 2017/0119932 A1 | 5/2017 | Mawatari et al. |

OTHER PUBLICATIONS

Shameli et al, "Fabrication of silver nanoparticles doped in the zeolite framework and antibacterial activity", International Journal of Nanomedicine 2011:6 pp. 331-341 (Year: 2011).

Mushtaq et al, "Preparation and characterization of silver coated aluminum for isolation of iodine-131 from fission products", J. Eng. Manuf. Technol. Mar. 2014, pp. 1-9 (Year: 2014).

Fauchais et al, "From Powders to Thermally Sprayed Coatings", Journal of Thermal Spray Technology, vol. 19, Jan. 2010, pp. 56-80. (Year: 2010).

* cited by examiner 10.0um                                                            500nm

FIG. 1A                                                   FIG. 1B

Hydroxyapatite, Ca10 ( OH )2 ( P O4 )6, 00-001-1008

2-theta (deg)

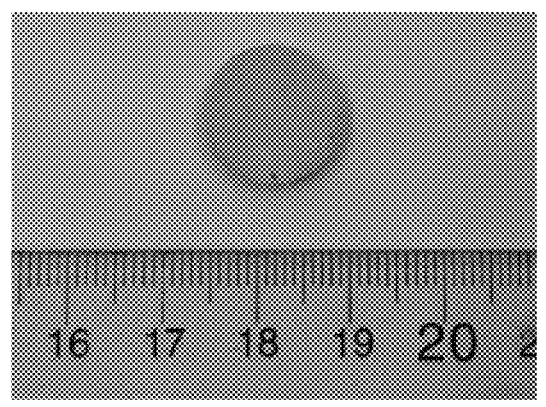
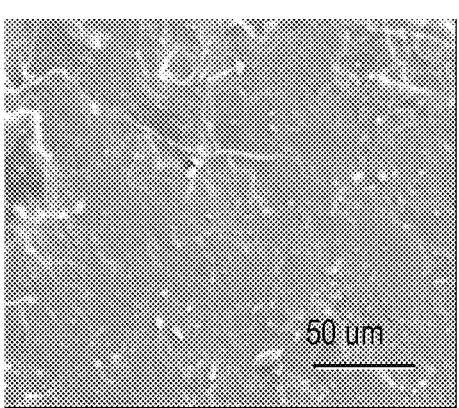
FIG. 3A                    FIG. 3B

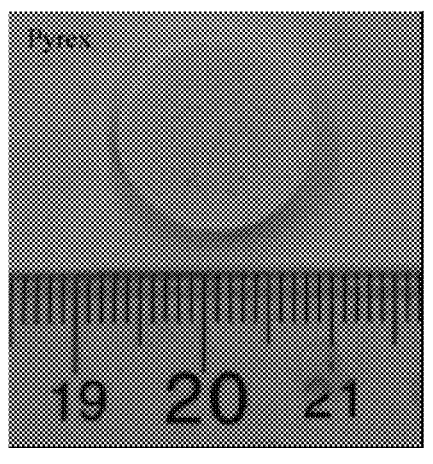
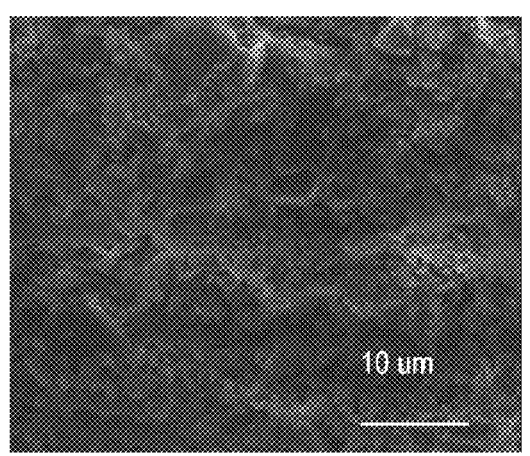
FIG. 4A                    FIG. 4B

METHODS OF USE AND MANUFACTURE OF SILVER-DOPED, NANO-POROUS HYDROXYAPATITE

CROSS-REFERENCE TO RELATED APPLICATIONS

This application is a divisional of U.S. patent application Ser. No. 16/257,514, filed Jan. 25, 2019, which claims benefit of U.S. Provisional Application No. 62/621,910, filed Jan. 25, 2018, which are both hereby incorporated by reference in their entireties.

STATEMENT REGARDING FEDERALLY SPONSORED RESEARCH

This invention was made with government support under Grant No. DE-SC0011906 awarded by the U.S. Department of Energy (DOE). The Government has certain rights in the invention.

TECHNICAL FIELD

The present disclosure relates to nuclear fuel cycle and waste technology. More specifically, the present disclosure relates to methods and materials useful for the removal of harmful waste from the nuclear fuel cycle, methods of using these materials to remove harmful waste, and methods of manufacturing such materials. Even more specifically, the material is a silver-doped nano-porous hydroxyapatite that is useful for removing radioactive iodine from waste streams produced from reprocessed spent nuclear fuel.

BACKGROUND

One of the most consistently reliable and efficient ways of producing energy is with nuclear power. Nuclear power is particularly useful for large-scale energy production of electricity. Like other energy producing technologies, a certain amount of waste is produced in the generation of this energy. Nuclear power is characterized by the very large amount of energy produced from a very small amount of fuel, and the amount of waste produced during this process is also relatively small. For instance, the amount of waste generated by nuclear power is very small relative to other thermal electricity generating technologies. However, much of the waste produced from nuclear power is radioactive, and therefore must be carefully managed as hazardous material.

One such radioactive waste product is radioactive iodine, $^{129}$I, a noble gas that is a volatile radionuclide generated during used nuclear fuel reprocessing. Because of its long half-life (approximately 15.7 million years) and harmful effects on human health, the long-term disposal of $^{129}$I is particularly important. $^{129}$I, like other radionuclides that tend to form volatile species that evolve into reprocessing facility off-gas systems, poses a greater challenge to efficiently control than radionuclides that remain with the solids or liquids during fuel reprocessing. Unless otherwise managed, $^{129}$I would be released into the environment.

Accordingly, it is desirable to provide an effective process for the capture and/or removal of radioactive iodine, $^{129}$I, present in spent nuclear fuel and other sources.

BRIEF SUMMARY

The present disclosure generally provides methods and materials useful for the capture and/or removal of harmful waste from the nuclear fuel cycle, methods of using these materials to remove harmful waste, and methods of manufacturing such materials. More specifically, the present disclosure provides a silver-doped, nano-porous hydroxyapatite material that can be utilized to capture and/or remove radionuclides, such as for example, radioactive iodine, $^{129}$I, that are present in spent nuclear fuel. Methods of using the silver-doped, nano-porous hydroxyapatite material and methods of manufacture are also provided.

In one exemplary embodiment of the present disclosure, a material for capturing a radioactive product is provided. The material may comprise a plurality of silver-doped microparticles. The microparticles may comprise hydroxyapatite. In some cases, the microparticles are irregularly shaped, while in other cases, the microparticles may be microspheres that are evenly shaped. These microparticles may be in the range of about 20-800 μm in diameter, and may include nanopores. According to one aspect of the disclosure, the radioactive product may comprise a volatile radionuclide. The volatile radionuclide may be iodine, such as $^{129}$I. Further, the microparticles may have a silver content in the range of about 0.50 to 5.00 wt %, and in some embodiments, may have a silver content in the range of about 1.60 to 1.75% wt % of the microparticles. In one embodiment, the silver content may be about 1.71 wt % of the microparticles.

In another exemplary embodiment of the present disclosure, a method of manufacturing a material for capturing a radioactive product is provided. The method involves preparing silver-doped hydroxyapatite from silver-sodium-calcium borate glass in a phosphate solution, melting the glass, quenching the glass melt in air, crushing the glass to a powder, passing the powder through high heat to form glass microparticles, and immersing the glass microparticles in a solution of $K_2HPO_4$ for a duration of time. In some embodiments, the glass may be melted at a temperature ranging from about 700 to about 1200, or about 1000° C., for a duration of time, such as between 30 minutes and 120 minutes, and in one embodiment for approximately 1 hour. The powder may comprise microparticles having a diameter in the range of about 20-800 μm. High heat may then be applied to the powder. For example, the powder may be passed through a flame to form a frit. In some embodiments, the glass microparticles may be immersed in the $K_2HPO_4$ solution for a duration of time, such as for example, between 2 to 6 days, and in one embodiment for about 4 days, at room temperature, after continuously stirring the solution for an initial amount of time, such as the first 24 hours.

In still another exemplary embodiment of the present disclosure, a method of immobilizing a radioactive product with silver-doped, nano-porous hydroxyapatite material is provided. The method involves providing a silver-doped, nano-porous hydroxyapatite material, capturing the radioactive product within the silver-doped, nano-porous hydroxyapatite material, and cold sintering the silver-doped, nano-porous hydroxyapatite material. According to one aspect, the silver-doped, nano-porous hydroxyapatite material comprises microparticles or microspheres. According to another aspect, the radioactive product comprises $^{129}$I. In some embodiments, the radioactive product may be captured in vapor form, while in other embodiments, the radioactive product may be captured in solution. In another embodiment, borosilicate or iron phosphate glass powders may be added to the material.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

FIG. 3A is a photograph of a pellet comprising cold-sintered (AgI)-HAp material produced in accordance with a method of the present disclosure.

FIG. 3B is a cross-sectional Scanning Electron Microscopy (SEM) micrograph of a fracture surface of the pellet of FIG. 3A.

FIG. 4A is a photograph of a pellet comprising cold-sintered borosilicate glass produced in accordance with a method of the present disclosure.

FIG. 4B is a cross-sectional Scanning Electron Microscopy (SEM) micrograph of a fracture surface of the pellet of FIG. 4A.

DETAILED DESCRIPTION OF THE EMBODIMENTS

Figure 1:
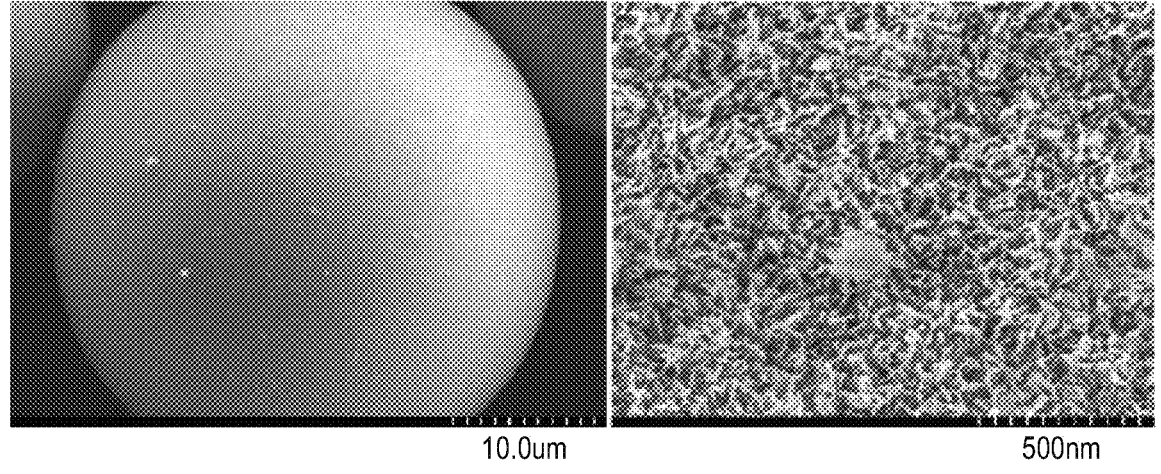
FIG. 1A is a Scanning Electron Microscopy (SEM) micrograph of an Ag-HAp microsphere (30 μm) transformed from a silver-sodium-calcium borate glass in accordance with a method of the present disclosure.
FIG. 1B is a Scanning Electron Microscopy (SEM) micrograph of the external surface of the porous Ag-HAp microsphere of FIG. 1A at high magnification showing 30 nm-100 nm sized HAp crystals.

Methods and materials useful for the capture and/or removal of harmful waste from the nuclear fuel cycle, methods of using these materials to remove harmful waste, and methods of manufacturing such materials, are provided with this disclosure. More specifically, the present disclosure provides a silver-doped, nano-porous hydroxyapatite material that can be utilized to capture and/or remove radionuclides, such as for example radioactive iodine, $^{129}I$, that are present in spent nuclear fuel. Methods of using the silver-doped, nano-porous hydroxyapatite material and methods of manufacture are also provided.

Radioactive iodine, $^{129}I$, is generated in the nuclear fuel cycle and so is present in spent nuclear fuel. Because of its long half-life (approximately 15.7 million years) and harmful effects on human health, the long-term disposal of $^{129}I$ is particularly important. It has been discovered that $^{129}I$ can be immobilized or captured by hollow or solid media composed of silver-doped hydroxyapatite (HAp) nanocrystals as $^{129}I_2$ vapor from the off-gas streams associated with reprocessing spent fuels. Some of the captured $^{129}I$ reacts with silver to form silver iodine iodide (AgI), while the rest is adsorbed in the HAp nanopores. After capturing $^{129}I$, the used (spent) HAp powders (in the form of microspheres or microparticles) can be consolidated into a dense, chemically stable form, typically at low temperatures (<150° C.) to avoid decomposition of AgI and loss of $^{129}I$ for removal or safe storage.

The following describes an exemplary method of manufacturing the silver-doped nano-porous hydroxyapatite material of the present disclosure.

Preparation of Silver-Doped Nano-Porous Hydroxyapatite Material

High surface area (>150 m²/g) powders (microspheres or irregular shaped microparticles) comprising nano-sized (e.g., 30-100 nm) silver-doped hydroxyapatite ($Ca_{10}(PO_4)_6(OH)_2$) designated as Ag-HAp crystals may be produced from silver-sodium-calcium borate glass in a phosphate solution using a process such as the transformation process described in the U.S. Pat. No. 6,358,531 (developed by Missouri S&T), the entire contents of which are herein incorporated by reference. Glass (e.g., composition of 0.59 mol % $Ag_2O$–19.88 mol % $Na_2O$–19.88 mol % CaO–59.65 mol % $B_2O_3$) may be melted at a high temperate in the range of about 700 to 1200° C., such as for example at about 1000° C., for a duration of time such as for example, between 30 minutes to 120 minutes. In one embodiment, the duration of time may be for about 60 minutes (1 hour). After melting, the molten glass can be quenched in air and then crushed to a powder to a desired size or diameter range (e.g., 20-800 μm) to form a sized frit. Glass microspheres may be produced with the application of high heat, for instance, by passing the sized frit through a flame. The sized glass microparticles (frit) or microspheres can then be immersed in 1 M $K_2HPO_4$ for a period of time, such as between about 2 to 6 days, for example for about 4 days, at room temperature with continuous stirring for an initial period of time, such as for example, the first 24 hours. The phase ratio between glass and $K_2HPO_4$ solution can be 1 kg:10 L.

Figure 2:
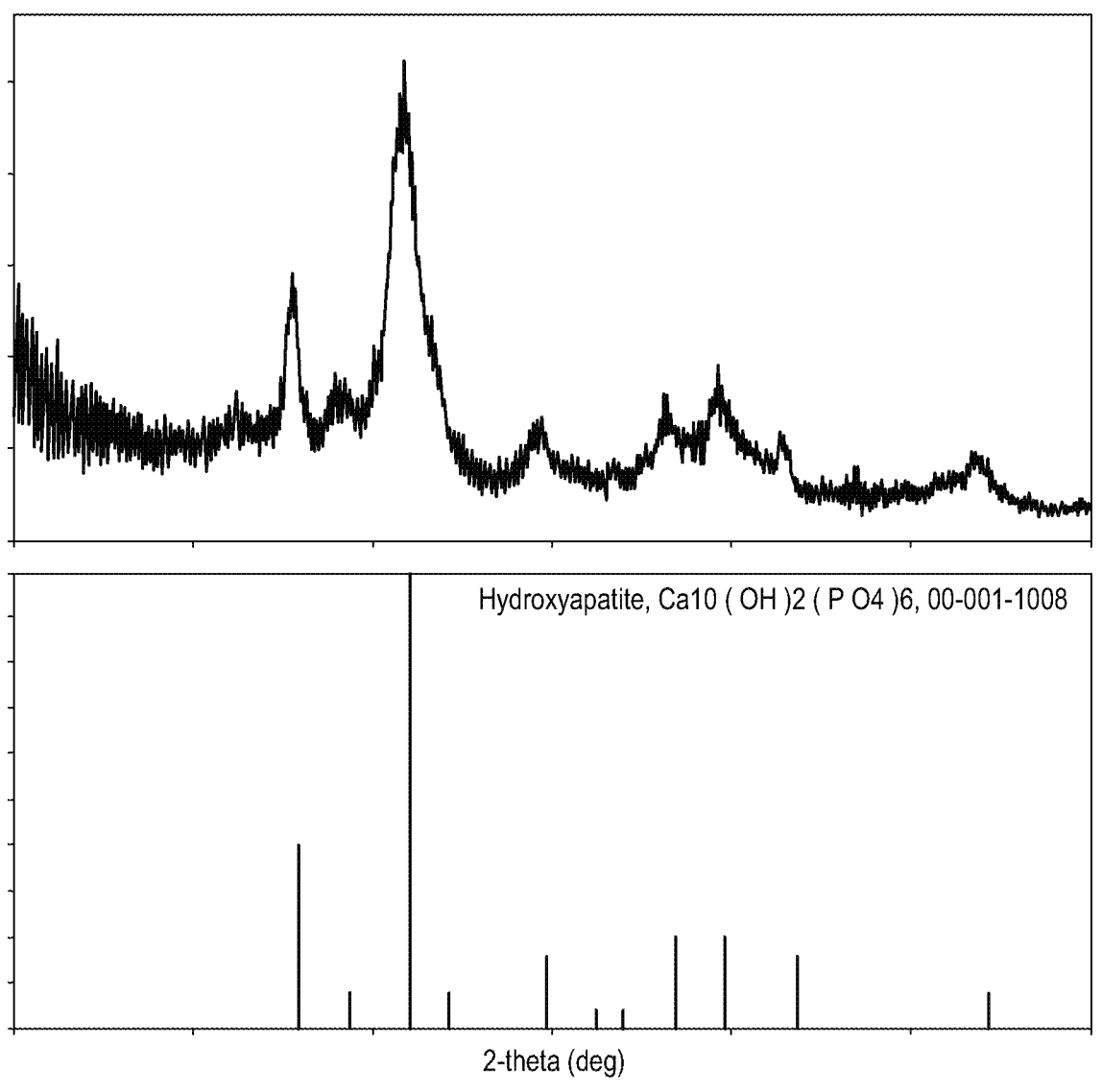
FIG. 2 is an X-ray diffraction (XRD) pattern of Ag-HAp material converted from a silver-sodium-calcium borate glass in accordance with a method of the present disclosure.

A resultant material produced by the method described above is illustrated in FIGS. 1A, 1B) and 2, in which silver-doped glass is fully converted to nano-porous HAp material containing silver (Ag). FIG. 1A is a SEM micrograph showing an Ag-HAp microsphere (30 μm) transformed from a silver-sodium-calcium borate glass in accordance with the method of the present disclosure. FIG. 1B is a SEM micrograph representing an enlarged view the external surface of the porous Ag-HAp crystalline microsphere of FIG. 1A at high magnification showing 30 nm-100 nm sized HAp crystals. FIG. 2 represents an X-ray diffraction (XRD) pattern of the Ag-HAp material converted from a silver-sodium-calcium borate glass. According to one aspect of the disclosure, the specific surface area (SSA) of converted Ag-HAp material is 120-220 m²/g as measured by the Brunauer-Emmett-Teller (BET) method. According to another aspect of the disclosure, the silver content of converted Ag-HAp material is in the range of about 0.50 to 5.00 wt %, and in one embodiment, is in the range of about 1.60 to 1.75 wt %, and still in another embodiment is about 1.71 wt %, as measured by X-ray fluorescence (XRF).

The following describes exemplary methods of using the silver-doped, nano-porous hydroxyapatite material to capture, immobilize, and/or remove, radioactive iodine.

Example 1: Iodine Capture from Vapor

Silver-doped, nano-porous hydroxyapatite (Ag-HAp) material, in the form of microspheres or irregular shaped microparticles, was placed on a nylon sieve covering a beaker. The beaker contained 100 ml of iodine solution (10% povidone-iodine, equivalent to 1% titratable iodine) on a hot plate and then the iodine solution was boiled using the hot plate until all was evaporated, with the resulting vapor passing through the bed of Ag-HAp particles. The particles were dried at 100° C. overnight, then analyzed. The dried Ag-HAp material contained 1.6 wt % iodine, equivalent to a Ag:I atomic ratio of 1.26.

Example 2: Iodine Capture from Solution

Silver-doped, nano-porous hydroxyapatite (Ag-HAp) material, in the form of microspheres or irregular shaped microparticles, was immersed in 25 ml of a five molar sodium hydroxide solution (pH 14) that contained 16.52 ppm of $I^-$ (dissolved KI). The material/solution was agitated on an orbital shaker for 24 hours at room temperature. After 24 hours, the leachate solution was collected using a 0.45 μm Nalgene syringe filter. The iodine in the solution before and after testing was determined by inductively coupled plasma-mass spectrometry (ICP-MS). The distribution coefficient $K_d$ value was calculated from the ICP-MS results per ASTM D4319-93 (Reapproved 2001), as listed below in Table 1.

TABLE 1

| | | | | Iodine removal from a five molar sodium hydroxide solution using Ag-Hap | | | |
|---|---|---|---|---|---|---|---|

| Media | SSA $(m^2/g)$ | Before $I^-$ (ppm) | After $I^-$ (ppm) | Phase Ratio (e.g., 1 g Ag-HAp:25 ml solution | $K_d$ (ml/g) | % $I^-$ Removal |
|---|---|---|---|---|---|---|
| Ag-HAp sample 1 | 180 | 16.52 | 0.005 | 25 | 77180 | 99.97 |
| Ag-HAp sample 2 | 137 | 16.52 | 0.066 | 25 | 6225 | 99.60 |

The following describes exemplary methods of using the silver-doped, nano-porous hydroxyapatite material to capture radioactive iodine, and then stabilize for storage or disposal.

Low-Temperature Process for Permanent Immobilization

In general, high-level radioactive waste can be immobilized to a chemically stable, solid form by high-temperature (≥1150° C.) processes (e.g., vitrification). However, low-temperature processes are required for the permanent immobilization of radioactive $^{129}I$ to avoid volatilization. The cold sintering process, which has been reported to densify ceramics (>0.9 relative density) at temperatures lower than 200° C. (see, for example, U.S. Patent Application Publication No. US 2017/0088471 A1), may be applied to waste forms for low-temperature immobilization. In one example, the Ag-HAp microparticles (containing 1.6 wt % I) used for filtering iodine vapor was densified for 1 hour at 400 MPa, 120° C. (lower than the AgI decomposition temperature 150° C.), with 20 wt % water. The cold-sintered (Ag,I)-HAp material, shown in the photograph of FIG. 3A, and its cross-sectional SEM micrograph, shown in FIG. 3B, shows no significant porosity. The relative density of samples prepared using different times, pressures, and temperatures ranged between 0.88 and 0.93. The iodine-content of the sample shown in FIGS. 3A and 3B was measured to be 1.6 wt % by SEM-EDS (energy dispersive X-ray spectroscopy) and this indicated that there was no measureable iodine loss/volatilization during the low-temperature sintering process.

Alternatively, the spent (Ag,I)-HAp material can be combined with chemically durable borosilicate or iron phosphate glass powders, and then densified using the cold sintering process. Borosilicate glass (Pyrex®) powders, with $d_{50}$ 3.8 μm, were mixed with a sodium silicate aqueous solution in a 75:25 by weight and then pressed at 400 MPa, at 120° C. for 1 hour, to yield pellets that had the same bulk density (2.2 $g/cm^3$) as the starting glass, cold-sintered borosilicate, as shown in the photograph of FIG. 4A. FIG. 4B represents a SEM micrograph of the cross-sectional fracture surface of the glass of FIG. 4A, and shows no significant porosity.

Accordingly, the present examples demonstrated that a silver-doped, nano-porous hydroxyapatite (Ag-HAp) material was possible to manufacture into microsphere or irregular shaped microparticle form, and that these Ag-HAp microspheres or microparticles could be effectively used to capture radioactive iodine, $^{129}I$, in vapor form or in solution, and that the microspheres or microparticles could then be further processed for permanent immobilization of the captured iodine, such as by cold sintering, in one embodiment.

It is of course understood that radioactive waste is not unique to the nuclear fuel cycle. Radioactive material exists in other technologies as well. For instance, radioactive materials are extensively used in, and are present in, medicine, agriculture, research, manufacturing, testing, and mineral exploration, to name some examples. Accordingly, the materials and methods of the present disclosure are not limited in their application to the nuclear fuel cycle, but can be equally applicable to these other technologies as well, for the removal and/or permanent immobilization of radioactive waste.

Other embodiments will be apparent to those skilled in the art from consideration of the specification and practice of the embodiment disclosed herein. It is intended that the specification and examples be considered as exemplary only, with a true scope and spirit of the embodiment being indicated by the following claims.

What is claimed is:

1. A method of immobilizing a radioactive product with silver-doped, nano-porous hydroxyapatite material, comprising:
   providing a silver-doped, nano-porous hydroxyapatite material in the form of microparticles or microspheres;
   capturing the radioactive product within the silver-doped, nano-porous hydroxyapatite material; and
   cold sintering the silver-doped, nano-porous hydroxyapatite material.

2. The method of claim 1, wherein the radioactive product is captured in vapor form.

3. The method of claim 1, wherein the radioactive product is captured in solution.

4. The method of claim 1, further including the step of adding borosilicate or iron phosphate glass powders.

5. The method of claim 1, wherein the microparticles are in the range of about 20-800 μm in diameter.

6. The method of claim 1, wherein the step of capturing comprises adsorbing the radioactive product.

7. The method of claim 1, wherein the silver content is in the range of about 0.50 to 5.00 wt % of the microparticles.

8. The method of claim 7, wherein the silver content of the material is in the range of about 1.25 to 2.00 wt % of the microparticles.

9. The method of claim 8, wherein the silver content is in the range of about 1.60 to 1.75 wt % of the microparticles.

10. The method of claim 1, wherein the radioactive product comprises a volatile radionuclide.

11. The method of claim 10, wherein the radionuclide comprises iodine.

12. The method of claim 11, wherein the iodine comprises $^{129}I$.

13. The method of claim 10, wherein the step of capturing comprises adsorbing the iodine.

14. The method of claim 13, further including the step of converting at least some of the captured iodine to silver iodide.

\* \* \* \* \*